United States Patent [19]

Song et al.

[11] 3,923,869

[45] Dec. 2, 1975

[54] 4-ALKYL-2,6-DIMETHYL-3-HYDROXYBENZYL ESTERS OF 3,3'-DIPROPIONIC ACID

[75] Inventors: John Song, Bound Brook; Henry Richmond, Whitehouse Station, both of N.J.

[73] Assignee: American Cyanamid Company, Stamford, Conn.

[22] Filed: May 24, 1973

[21] Appl. No.: 363,439

Related U.S. Application Data

[62] Division of Ser. No. 123,001, March 10, 1971, Pat. No. 3,795,700.

[52] U.S. Cl.............................................. 260/481 R
[51] Int. Cl.²........................................ C07C 149/20
[58] Field of Search .............................. 260/481 R

[56] References Cited
UNITED STATES PATENTS 3,116,305   12/1963   Morris et al. .................. 260/469
3,758,549   9/1973   Dexter et al. .................. 260/481

OTHER PUBLICATIONS

Silhan, C. A., 68, 77885d, (1968).

Shell, C. A., 57 (11103c), (1962).
Shell, C. A., 57 6094f, (1962).

*Primary Examiner*—John F. Terapane
*Attorney, Agent, or Firm*—Philip Mintz

[57] ABSTRACT

Compounds of the formula:

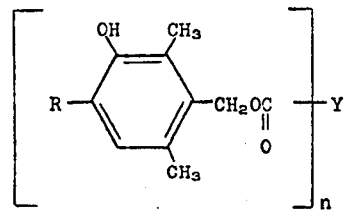

wherein R is a branched chain alkyl group containing 3 to about 12 carbon atoms; Y is the residue of the carboxylic acid Y(COOH)n, provided that when Y is alkyl and *n* is one, Y contains more than 10 carbon atoms; and *n* is one to four. These compounds are useful as antioxidants in organic substrates, such as polyolefines, rubber, etc.

2 Claims, No Drawings

4-ALKYL-2,6-DIMETHYL-3-HYDROXYBENZYL ESTERS OF 3,3'-DIPROPIONIC ACID

This is a division of application Ser. No. 123,001 filed Mar. 10, 1971, now U.S. Pat. No. 3,795,700.

This invention relates to novel compounds useful for inhibiting oxidative degradation of organic materials. More particularly, it relates to compounds of the formula:

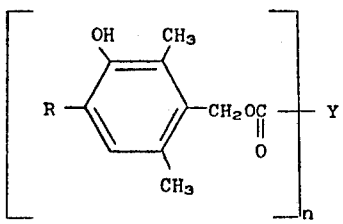

wherein R is a branched chain alkyl group containing 3 to about 12 carbon atoms; Y is the residue of the carboxylic acid Y(COOH)n, provided that when Y is alkyl and n is one, Y contains more than 10 carbon atoms, and n is one to four. This invention also relates to the use of such compounds to inhibit oxidative degradation of organic materials subject thereto.

It is well known that numerous organic materials tend to deteriorate upon exposure to oxygen in air. Among such materials are polyolefines, ABS resins, polyamides, polyacetals, polystyrene, impact polystyrene, natural and synthetic rubbers including ethylene-propylene copolymers and carboxylated latices, fats, oils, greases, gasoline, etc. It is also well known to incorporate various additives (antioxidants) into such materials to inhibit oxidative degradation thereof. This invention arises out of the continuing search for new compounds which will be superior antioxidants for such materials.

The compounds of the present invention, as defined in the formula above, critically have a methylene group connecting the benzene ring with the ester carboxyl group which is located meta to the hindered phenolic hydroxyl group and have all positions ortho and para to the phenolic hydroxyl group occupied by substituents.

Illustrative of the branched chain alkyl groups represented by R in the position ortho to the phenolic hydroxy group and para to the ester group in the compounds of this invention are isopropyl, t-butyl, sec-butyl, t-amyl, sec-heptyl, sec-octyl, t-octyl, t-nonyl (1,1-dimethylheptyl), α,α-dimethylbenzyl, methylcyclopentyl, methyl cyclohexyl, and the like.

Illustrative of the carboxylic acids Y(COOH)n of which the moiety Y forms part of these compounds are monocarboxylic acids such as stearic, lauric, myristic, palmitic, eicosanoic, benzoic, naphthoic, toluic, salicylic, phenylacetic, hydrocinnamic, phenylglycolic, pyridine carboxylic, naphthalene monocarboxylic, mesitoic, oleic, linoleic, and the like; dicarboxylic acids such as 3,3'-thiodipropionic, isophthalic, phthalic, hexahydrophthalic, terephthalic, adipic, p-phenylenediacetic, oxalic, malonic, succinic, glutaric, pimelic, suberic, azeleic, sebacic, diphenic, homophthalic, maleic, fumaric, itaconic, and the like; and polycarboxylic acids such as trimesic, trimellitic, pyromelitic, tricarballylic, aconitic, hemimellitic, naphthalene tetracarboxylic, and the like.

These compounds may be prepared by known procedures such as the esterification reaction of the 4-alkyl-2,6-dimethyl-3-hydroxybenzyl alcohol or halide with the carboxylic acid, acid salt, or acid halide.

These compounds are especially useful for inhibiting oxidative degradation of organic materials normally subject to deterioration upon exposure to oxygen, such as those mentioned above. These compounds may be incorporated into the various organic materials to be protected by any of the standard techniques, including stirring, milling, screw extruding, Banbury mixing, swelling, etc. These compounds are effective over a wide concentration range of about 0.01 to about 5.0 percent based on weight of material to be protected. In polypropylene, a preferred use, they are preferably used at a concentration between 0.05 and 1.0 percent based on the weight of the polyolefin. After incorporating these compounds into polymeric materials, during which other ingredients such as fillers, plasticizers, pigments, light absorbers, etc. may be added, the polymer composition is formed into useful shapes by molding, casting, spinning, extruding, injection molding, or other shaping procedures. In polypropylene, the antioxidant activity of these compounds can be greatly enhanced by concurrent use therein of esters of thiodipropionic acid.

Oxidative deterioration of polypropylene and other similar oxidizable plastic materials is evident from the embrittlement which occurs on exposure to atmospheric oxygen. The extent to which the antioxidant protects against deterioration is measured by determining the hours to embrittlement at 140°–150°C. when a specimen containing the antioxidant is exposed in a forced draft oven at this temperature.

Examples 1–12 illustrate the preparation of some representative compounds according to the present invention. Examples 1–12 also show test results obtained (Brittle Point in Hours) by the following test.

The compounds were incorporated into unstabilized polypropylene at 0.2% concentration by milling at 175°–180°C. Compression molded films (15–20 mils) were oven aged in a forced-draft oven at 140°C. and the time (hours) to embrittlement was recorded. In some instances, the compounds were compared with compounds disclosed in or suggested in the prior art, derived from 3,5-di-tert.-butyl-4-hydroxy benzyl alcohol (See U.S. Pat. No. 3,116,305).

EXAMPLE 1

4-Tert.-butyl-3-hydroxy-2,6-dimethylbenzylstearate

A mixture of 11.32 g. (0.05 mole) of 4-tert.-butyl-3-hydroxy-2,6-dimethylbenzyl chloride, 14.26 g. (0.05 mole) of stearic acid, and 58.6 g. (0.58 mole) of triethylamine was allowed to react at a temperature of 88°–96°C. over a period of 14 hours. The reaction mixture was cooled and the salt collected. The filtrate was concentrated in vacuo to an oily residue, taken up in ether, and the unreacted stearic acid removed by treatment with 10% sodium bicarbonate solution.

The ether soluble fraction amounted to 14 g. Purification by chromatography on aluminum oxide using a benzene-hexane (1:1) mixture gave an oily product. The infrared spectrum of a specimen showed the expected major absorption bands. The assigned structure was also supported by n.m.r. results.

This compound protected polypropylene films from embrittlement for 219–245 hours at 140°C. whereas the corresponding prior art compound (Example III of U.S. Pat. No. 3,116,305), 3,5-di-t-butyl-4-hydroxybenzyl stearate only protected such films for 55–94 hours. Unprotected polypropylene films lasted only 0–4 hours before embrittlement. Thus, this compound is about three times as effective as the corresponding prior art compound.

EXAMPLE 2

Bis(4-tert.-butyl-3-hydroxy-2,6-dimethylbenzyl)-3,3'-thiodipropionate

A mixture of 11.11 g. (0.05 mole), of sodium 3,3'-thiodipropionate, 24.92 g. (0.11 mole) of 4-tert.-butyl-3-hydroxy-2,6-dimethylbenzyl chloride and 35 ml. of dimethylformamide was heated at 105°–114°C. for a period of 4 hours. The reaction mixture was cooled to 100°C. and added to 150 ml. of ice water to form an oil. This was extracted with 150 ml. of benzene, washed with water, and dried over anhydrous sodium sulfate. The benzene solution was concentrated in vacuo to give 31.75 g. of an oil. Purification was carried out by successive chromatography using silica gel with a hexane-ethyl acetate (3:1) mixture, aluminum oxide with chloroform, and aluminum oxide with benzene-chloroform (4:1) mixture, respectively. The infrared spectrum of a sample exhibited the expected major absorption bands. N.m.r. results supported the assigned structure.

This compound protected polypropylene films from embrittlement for 320–330 hours at 140°C. whereas the corresponding 3,3'-thiodipropionate bis ester of 3,5-di-t-butyl-4-hydroxybenzyl alcohol only protected such films for 6–22 hours. Thus, this compound is about 20 times as effective as the corresponding compound most similar to the prior art.

EXAMPLE 3

(4-Tert.-butyl-3-hydroxy-2,6-dimethylbenzyl)laurate

A mixture of 30 g. (0.13 mole) of 4-tert.-butyl-3-hydroxy-2,6-dimethylbenzyl chloride and 29.4 g. (0.13 mole) of sodium laurate in 35 ml. of dimethylformamide was heated at 94°–102°C. for a period of 7 hours. The hot melt was added to 300 g. of ice water slurry. The oil was taken up in 250 ml. of benzene, washed with water and dried over anhydrous sodium sulfate. The salt was filtered and the filtrate concentrated in vacuo to give 44 g. of an oil.

Purification was carried out by successive chromatography on aluminum oxide using hexane-chloroform (1:2) mixture and on silica gel using chloroform. The infrared spectrum of a sample showed the unexpected major absorption bands. Anal. calc'd.: H=10.77; C=76.92. Found: H=10.87, C=76.00.

This compound protected polypropylene films from embrittlement for 50–60 hours at 140°C. whereas the corresponding prior art compound (Example XV, last line, of U.S. Pat. No. 3,116,305), 3,5-di-t-butyl-4-hydroxybenzyl laurate only protected such films for 6–22 hours. Thus, this compound is about four times as effective as the corresponding prior art compound.

EXAMPLE 4

Bis(4-tert.-butyl-3-hydroxy-2,6-dimethylbenzyl)isophthalate

A mixture of 34 g. (0.15 mole) of 4-tert.-butyl-3-hydroxy-2,6-dimethylbenzyl chloride, 12.5 g. (0.075 mole) of isophthalic acid, and 18.25 g. (0.18 mole) of triethylamine in 35 ml. of dimethylformamide was heated at a temperature of 97°–100°C. for a period of 16⅔ hours. The hot melt was added to 300 g. of ice slurry to form 43 g. of a semisolid. This was extracted with 300 ml. of benzene and the benzene solution decolorized with charcoal. The filtrate was concentrated in vacuo to give 36 g. of a light amber colored oil. This was dissolved in 40 ml. of ethanol and diluted with 150 ml. of acetic acid. The mixture was added to 250 ml. of water to give 30 g. of a tan amorphous powder. Further purification was carried out by chromatography on aluminum oxide using chloroform to obtain 26 g. of an amber oil. On standing, the oil gave 14 g. of cream colored crystals, m.p. 155°–156°C. Anal. calc'd.: C=74.73, H=7.69; Found: C=75.15, H=7.62.

This compound protected polypropylene films from embrittlement for 822–840 hours at 140°C. whereas the compound most similar to the prior art (the isophthalate isomer of the phthalate of Example IV of U.S. Pat. No. 3,116,305), bis(3,5-di-t-butyl-4-hydroxybenzyl) isophthalate only protected such films for 222–235 hours. Thus, this compound is about four times as effective as the corresponding compound most similar to the prior art compounds.

EXAMPLE 5

Tris(4-tert.-butyl-3-hydroxy-2,6-dimethylbenzyl)-trimesate

Prepared in a manner similar to Example 4 using trimesic acid. The product was obtained as a glassy solid. The assigned structure was supported by n.m.r. and infrared spectra.

This compound protected polypropylene films from embrittlement for 678–694 hours at 140°C.

EXAMPLE 6

Tris(4-tert.-butyl-3-hydroxy-2,6-dimethylbenzyl) trimellitate

Prepared in a manner similar to Example 4 using trimellitic acid. The product was obtained as a solid melting at 108°–111°C. and the structure was supported by n.m.r. and infrared spectra.

This compound protected polypropylene films from embrittlement for 483–499 hours at 140°C.

EXAMPLE 7

Bis(4-tert.-butyl-3-hydroxy-2,6-dimethylbenzyl)phthalate

A mixture of 25 g. (0.11 mole) of 4-tert.-butyl-3-hydroxy-2,6-dimethylbenzyl chloride, 10.5 g. (0.05 mole) of sodium phthalate in 30 ml. of dimethylformamide was heated at 100°–103°C. for a period of 6⅔ hours. The cooled melt (90°C.) was added to 300 ml. of ice water to form a mass of soft crystals. This was collected and dried in vacuo at 75°C. The crude product was purified by chromatography on aluminum oxide using chloroform to obtain 10 g. of cream colored crystals, m.p. 140°–1°C.

A recrystallization from chloroform gave 7 g. of an analytical specimen, m.p. 145°–7°C. The n.m.r. results supported the assigned structure. The infrared specimen exhibited the major absorption bands expected.

This compound protected polypropylene films from embrittlement for 454–462 hours at 140°C. whereas the corresponding prior art compound (Example IV of U.S. Pat. No. 3,116,305), bis(3,5-di-t-butyl-4-hydroxybenzyl)phthalate only protected such films for 142–150 hours. Thus, this compound is about three times as effective as the corresponding prior art compound.

EXAMPLE 8

Tetrakis(4-tert.-butyl-3-hydroxy-2,6-dimethylbenzyl)-pyromellitate

Prepared by reaction of 4-tert.-butyl-3-hydroxy-2,6-dimethylbenzyl alcohol and pyromellitoyl chloride in the presence of pyridine and THF. M.p. 123°–125°C. Anal. Calc'd. for $C_{62}H_{78}O_{12}$: C=3.37, H=7.69; Found: C=73.76, H=7.95.

This compound protected polypropylene films from embrittlement for 312–328 hours at 140°C.

EXAMPLE 9

Bis(4-tert.-butyl-3-hydroxy-2,6-dimethylbenzyl)hexahydrophthalate

A mixture of 12.96 g. (0.06 mole) of sodium hexahydrophthalate, 28.2 g. (0.124 mole) of 4-tert.-butyl-3-hydroxy-2,6-dimethylbenzyl chloride in 50 ml. of dimethylformamide was heated at 98°–101°C. for a period of 7 hours. The hot melt was added to 350 ml. of ice water to give 33 g. of cream colored crystals, m.p. 162°–164°C. dec. Two recrystallizations from a hexane-chloroform (1:1) mixture gave an analytically pure specimen, m.p. 165°–70°C. dec. The infrared spectrum exhibited the major absorption bands expected. The assigned structure was supported by n.m.r. results.

This compound protected polypropylene films from embrittlement for 344–408 hours at 140°C. whereas the compound most similar to the prior art (the hexahydrophthalate analog of the adipate and phthalate of Examples I and IV of U.S. Pat. No. 3,116,305), bis(3,5-di-t-butyl-4-hydroxybenzyl) hexahydrophthalate only protected such films for 112–120 hours. Thus, this compound is over three times as effective as the corresponding compound most similar to the prior art compounds.

EXAMPLE 10

Bis(4-tert.-butyl-3-hydroxy-2,6-dimethybenzyl)terephthalate

A mixture of disocium terephthalate, 16.5 g. (0.08 mole) and 4-tert.-butyl-3-hydroxy-2,6-dimethylbenzyl chloride, 35.7 g. (0.158 mole) in 200 ml. of dimethylformamide was heated at reflux for 18 hours. The salt was then filtered off, and the filtrate poured into 400 ml. of water. The resulting brown gum was dissolved in 50 ml. of methanol and reprecipitated by addition of water. This procedure was repeated to give 18.9 g. (44%) of product, m.p. 227°–230°C. Anal. calc'd. for $C_{34}H_{42}O_6$: C=74.67, H=7.75; found: C=72.03, H=7.75.

This compound protected polypropylene films from embrittlement for 880–890 hours at 140°C. whereas the compound most similar to the prior art (the terephthalate isomer of the phthalate of Example IV of U.S. Pat. No. 3,116,305), bis(3,5-di-t-butyl-4-hydroxybenzyl) terephthalate only protected such films for 245–262 hours. Thus, this compound is about 3½ times as effective as the corresponding compound most similar to the prior art compounds.

EXAMPLE 11

Bis(4-tert.-butyl-3-hydroxy-2,6-dimethylbenzyl)adipate

Prepared in a similar manner to Example 10 using disodium adipate instead of disodium terephthalate. M.p. 156°–158°C. Anal. calc'd for $C_{32}H_{46}O_6$: C=72.95, H=8.80; found: C=72.78, H=8.35.

This compound protected polypropylene films from embrittlement for 400–410 hours at 140°C. whereas the corresponding prior art compound (Example I of U.S. Pat. No. 3,116,305), bis(3,5-di-t-butyl-4-hydroxybenzyl)adipate only protected such films for 95–100 hours. Thus, this compound is about four times as effective as the corresponding prior art compound.

EXAMPLE 12

Bis(4-tert.-butyl-3-hydroxy-2,6-dimethylbenzyl)-p-phenylenediacetate

Prepared in a similar manner to Example 10 using disodium p-phenylene diacetate. M.p. 148°–149°C. Anal. calc'd. for $C_{36}H_{46}O_6$: C=75.21, H=8.08; found: C=74.78, H=8.49.

This compound protected polypropylene films from embrittlement for 313–328 hours at 140°C.

The data contained in the foregoing examples demonstrate that the compounds of the present invention are effective in protecting polypropylene films from embrittlement and, in those cases where comparative tests were conducted, they are at least three times as effective as the closest prior art compounds. This startling difference is believed due to the location of the methylene-ester group meta to the hindered phenolic hydroxyl group (in contrast to the prior art where such location was para).

EXAMPLE 13

Evaluation in ABS Resins

The compound of Example 10, bis(4-tert.-butyl-3-hydroxy-2,6-dimethylbenzyl)terephthalate, was evaluated in an unstabilized ABS polymer (Marbon Chemical Co.) at 0.5% in a formulation containing 1.0% zinc stearate as a lubricant, and 5% titanium dioxide pigment. The additive was incorporated into the above formulation by milling at 175°C. and compression molded into 70–75 mil plaques. The plaques were oven aged at 150°C. The efficiency of the antioxidant was measured in terms of discoloration and hours to embrittlement at 150°C. Results are shown in Table I.

TABLE I

| Sample | Brittle Point (Hrs.) | 150°C. Oven Aging Δ (YI) | |
|---|---|---|---|
| | | 5 Hours | 12 Hours |
| Control | 5–12 | 19 | 42 |
| Compound of Example 10 | 49–56 | 7 | 11 |

The data show that the compound of Example 10 affords protection against oxidative degradation (embrittlement) of from 5–10 times that of the control sample. Moreover, the increase in color on oven aging is considerably less in the stabilized sample.

EXAMPLE 14

|  | A | B |
|---|---|---|
| Natural rubber | 100 | 100 |
| Stearic acid | 0.5 | 0.5 |
| Microcrystalline wax (Sunproof Super-U.S. Rubber) | 0.5 | 0.5 |
| Calcium carbonate (Atomite-Thompson-Weinman) | 80.0 | 80.0 |
| Titanium dioxide | 20.0 | 20.0 |
| Zinc oxide | 5.0 | 5.0 |
| Processing oil | 1.0 | 1.0 |
| Mercaptobenzothiazole | 0.5 | 0.5 |
| Benzthiazolydisulfide (MBTS) | 0.5 | 0.5 |
| Tetramethylthiuram disulfide | 0.05 | 0.05 |
| Sulfur | 2.25 | 2.25 |
| Compound of Example 10 | — | 1.0 |

The above compositions were separately mixed on a standard rubber mill and cured for 30 minutes at 130°C. Percent tensional creep was measured according to a modification of ASTM D 1206–62T, ASTM standard 1964, part 28, page 613. Sample size 4 × 0.196 × 0.075 inches. The test was conducted at 90°C. under a load of 50 psi for 110 hours. Composition A gave percent tensional creep of 27.0 versus 18.3 for composition B, a significant improvement over the control.

EXAMPLE 15

The compound of Example 10 was evaluated in carboxylated latex in the following manner.

Solution A: Oleic acid (40 grams) is dissolved in 320 grams of toluene.

Solution B: Triethanolamine (32 grams) is dissolved in 168 ml. of water.

The antioxidant (2.0 grams) is added to 18 grams of Solution A with vigorous agitation in a suitable blender. After all the antioxidant has been added, 20 grams of Solution B is added dropwise with vigorous agitation. The resulting emulsion contains 5% by weight of the antioxidant.

A mixture consisting of 50 grams of carboxylated latex (Pliolite Latex 480; 55.5% solids) and 5.55 grams of the emulsion as prepared above is vigorously stirred and then allowed to stand for 48 hours. The antioxidant is present in an amount of 1% by weight, based on the latex solids.

The composite elastomer-glass fiber specimen is prepared by dip coating a multistrand glass fiber with the latex under study. A 10 inch length of glass fiber is coated with the latex. It is then air dried for 20 minutes and vacuum dried at room temperature for 20 minutes. The fiber is then re-dipped and the process repeated. The coated glass fiber is then aged for 15 minutes at 150°C. in a circulating air oven. The composite specimen is then mounted in a Torsional Braid Apparatus and heat aged at 150°C.

Heating the braids at constant elevated temperature induces oxidative reactions in the elastomer coatings. These reactions will be more or less inhibited in accordance with the concentration of the antioxidant and its relative activity. The oxidative changes are manifested by a progressive embrittlement of the elastomer with time of heat aging. Intermittent measurement of the torsional rigidity of the braids during the course of the heat aging provides a convenient and sensitive measure of the rate of degradation of the elastomer. This is accomplished by vertically suspending a braid of fixed length in the TBA apparatus described by Lewis and Gillham, J. Appl. Polymer Sci., 7, 685 (1963). An inertial mass of convenient size is hung on the lower end of the braid to form a torsional pendulum which, when operating in free oscillation, can be used to measure rigidity changes of the elastomer coated braids as a function of time. This is accomplished by determining the period of oscillation of the pendulum. The rigidity can be calculated through utilization of the approximate relationship $G' \approx k(1/p^2)$, where $G'$ is the rigidity (shear) modulus, P is the period of oscillation, and $k$ is a constant that depends on the geometry and mass of the pendulum. The relative rigidity $G'_t/G'_o$ is defined as the ratio of the ridigity modulus $G'_t$ obtained after some heat aging time $t$ to the rigidity modulus $G'_o$ obtained initially. In the present data the time of embrittlement of the braid containing the antioxidant, $t_{emb}{}^c$, and time of embrittlement of the control, $t_{emb}{}^o$, are obtained. They are

| Control | 360 minutes |
|---|---|
| Compound | 1520 minutes |

We claim:

1. A compound of the formula:

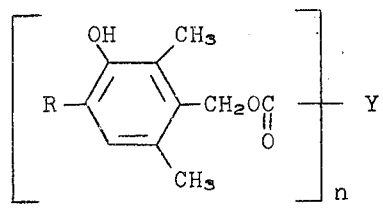

wherein R is a branched chain alkyl group containing 3 to about 12 carbon atoms; Y is the residue of the carboxylic acid $Y(COOH)_n$ which is 3,3'-thiodipropionic acid; and $n$ is 2.

2. A compound as defined in claim 1 which is bis(4-tert.-butyl-3-hydroxy-2,6-dimethylbenzyl) 3,3'-thiodipropionate.

* * * * *